Patented July 13, 1954

2,683,751

UNITED STATES PATENT OFFICE 2,683,751

PHENOL PRODUCTION

Leo J. Filar, Wilmington, Del., assignor to Hercules Powder Company, Wilmington, Del., a corporation of Delaware No Drawing. Application October 31, 1950, Serial No. 193,293

18 Claims. (Cl. 260—621)

This invention relates to organic hydroperoxides and more particularly to that class of primary hydroperoxides in which at least one hydroperoxymethyl group is attached to an aromatic ring.

There have been numerous processes developed for the purpose of producing phenols but even those processes which have been adapted to commercial production are not entirely satisfactory. They require large equipment investment and installation to provide facilities for the raw materials used and they must be operated on the basis of large production capacity in order to produce phenol at a reasonable price. In addition, the processes are disadvantageous because of the many steps involved and the considerable problem of disposal of waste water contaminated with phenol.

Now in accordance with this invention it has been found that phenolic compounds and formaldehyde may be prepared simultaneously by contacting with an acidic condensation catalyst a primary hydroperoxide of the class characterized by an aromatic nucleus having attached to the ring thereof at least one hydroperoxymethyl group. The aromatic nucleus may be free of substituents other than the hydroperoxymethyl group or groups, or it may be substituted with one or more or a mixture of alkyl, aralkyl, halogen, alkoxy, nitro and cyano groups, or the like. The aromatic nucleus is not limited to benzene derivatives, but may be a derivative of one of the condensed ring systems such as naphthalene, phenanthrene, anthracene, and the like.

The primary hydroperoxides of this invention may be prepared by passing an oxygen-containing gas under noncatalytic conditions through the corresponding hydrocarbon or halogen, nitro, etc. substituted hydrocarbon in the liquid phase in the presence of a peroxidic material. For example, p-xylene can be oxidized to p-methylbenzyl hydroperoxide by passing oxygen through this compound in the liquid phase at a temperature of, for example, 135° C. in the presence of a peroxide such as di-t-butyl peroxide. The hydroperoxides of this invention are particularly useful in that they may be decomposed to produce phenols and substituted phenols along with formaldehyde with a maximum of simplicity and economy. The decomposition process is straightforward and is capable of producing phenols having definite structures while at the same time producing formaldehyde as an additional valuable product. This is in contrast to previous processes for preparing phenols.

In carrying out the process of this invention the hydroperoxides such as p-methylbenzyl hydroperoxide, which may be dissolved in a solvent such as methanol, is contacted with a catalyst such as sulfuric acid at a temperature, for example, of about 100° C. until the hydroperoxide is completely decomposed to the corresponding phenol. The phenol in this instance is p-cresol and the other product of the decomposition reaction is formaldehyde.

The following examples constitute specific illustrations of the process of this invention. Unless otherwise specified all quantities are on the basis of parts by weight.

Example 1

Into a glass reaction vessel equipped with a stirrer, a reflux condenser and an oxygen inlet tube was charged 100 parts of p-xylene and 10 parts of di-t-butyl peroxide. The reaction mixture was heated to 135° C. and oxygen was passed through the mixture at the rate of 25 liters/hr./kg. of hydrocarbon. After two hours of reaction time, the reaction mixture was cooled and a product containing 82% p-methylbenzyl hydroperoxide was separated from the reaction mass by countercurrent extraction with 2% alkali.

To a reaction vessel equipped with a stirrer and condenser there was charged 32 parts of an anhydrous 1.25% sulfuric acid solution in methanol. The temperature was raised to the reflux temperature and 41.3 parts of a p-methylbenzyl hydroperoxide product prepared as shown above, which contained 82% p-methylbenzyl hydroperoxide, was slowly added through the condenser followed by 32 parts of methanol. After the reaction mixture was refluxed for 1.5 hours, an active oxygen analysis of the reaction product, obtained by adding a sample of the reaction mixture to acidified potassium iodide, indicated that 5.6 parts of hydroperoxide remained undecomposed. Seventeen parts of a 3% sulfuric acid solution in methanol was then added and the reaction mixture refluxed for an additional hour. There was obtained 87 parts of a crude reaction product which contained 12% p-cresol as determined by ultraviolet light absorption techniques. The p-cresol was recovered in the following manner. Seventy-seven parts of the crude reaction product was neutralized with 50% sodium hydroxide and volatiles were removed by distillation. The residue was then dissolved in a benzene-hexane mixture. This solution was washed with sodium bicarbonate, extracted with 4% sodium hydroxide, the extract acidified and the liberated cresol taken up in ethyl acetate. After distilling off the solvent, the residual liquid was crystallized to obtain a 55% yield of p-cresol, based upon the hydroperoxide actually decomposed.

*Example 2*

Into a glass reaction vessel equipped with a stirrer, a reflux condenser, and an oxygen inlet tube was charged 500 parts of p-cymene in the presence of 50 parts of a 2% aqueous solution of sodium carbonate and 2.5 parts $\alpha,\alpha$-dimethyl-p-methylbenzyl hydroperoxide as initiator. The reaction mixture was heated to 115° C. and oxygen under a pressure of 80 lb./sq. in. was passed through the mixture at the rate of 25 liters/hr./kg. of p-cymene. The oxidation reaction was allowed to proceed for 5.6 hours. After removing the solid material by filtration, unreacted hydrocarbon was partially removed by vacuum distillation leaving a solution containing 9.2% p-isopropylbenzyl hydroperoxide.

To a reaction vessel equipped with a stirrer, a condenser, and an inlet tube there was charged 0.3 part concentrated sulfuric acid in 52 parts of acetone, and the temperature was raised to boiling. There was then added slowly to the reaction vessel 174 parts of the 9.2% p-isopropylbenzyl hydroperoxide solution prepared above. During the addition, which required 30 minutes, the temperature rose gradually from 56° C. to 75° C. After the addition was completed, the mixture was stirred for 20 minutes without further heating, after which time decomposition of the hydroperoxide was essentially complete. The sulfuric acid catalyst was neutralized with aqueous sodium hydroxide and the reaction mixture was fractionally distilled at atmospheric pressure to remove acetone, formaldehyde, unreacted hydrocarbon, and other hydroperoxide decomposition products. There was obtained a fraction containing 10.9 parts of isopropylphenol which represented a yield of 83% of the theoretical, based on the p-isopropylbenzyl hydroperoxide in the starting material.

*Example 3*

This example illustrates the cleavage of a primary hydroperoxide in a heterogeneous system with aqueous sulfuric acid. Benzyl hydroperoxide was prepared by passing molecular oxygen through 100 parts of toluene at the rate of 25 liters/hr./kg. of toluene in the presence of 10 parts of $\alpha,\alpha$-dimethylbenzyl hydroperoxide. The temperature was maintained at 125° C. After 3 hours of reaction time, benzyl hydroperoxide was separated from the reaction mass by countercurrent extraction with 2% alkali and from the extract there was obtained a solution of 50% benzyl hydroperoxide in toluene.

Twenty-five parts of the benzyl hydroperoxide-toluene solution was added over a 30 minute period to 10 parts of vigorously agitated 20% sulfuric acid. The temperature was maintained at 90–100° C. during the addition of the hydroperoxide solution and for 15 minutes thereafter. The reaction mixture was then allowed to cool to room temperature. Analysis of the organic layer indicated that the hydroperoxide was essentially completely decomposed. The organic layer was separated and extracted with 10% alkali. The alkaline extract was then acidified, saturated with sodium chloride and washed thoroughly with ether. The ether washings were dried and finally distilled to yield 4.25 parts of crystalline phenol which corresponded to 45.7% of the theoretical yield, based upon the quantity of benzyl hydroperoxide originally present. Formaldehyde was also produced during the decomposition.

The hydroperoxides which may be decomposed in accordance with this invention are those primary hydroperoxides in which the hydroperoxy group is attached to a methylene group which in turn is attached to an aromatic ring. Exemplary of such compounds are benzyl hydroperoxide, and its ring-substituted homologs such as the alkyl, dialkyl, trialkyl, tetraalkyl, etc. substituted primary benzyl hydroperoxides. The alkyl groups attached to the aromatic nucleus may be methyl, ethyl, propyl, isopropyl, butyl, isobutyl, sec-butyl, t-butyl, amyl and higher alkyl groups. In the case of hydroperoxide having more than one alkyl group attached to the aromatic ring the alkyl group may be the same or different and may be any of the alkyl groups mentioned above. In addition, there may be attached to the ring of the aromatic nucleus or to one of the above-named alkyl groups one or more halogen, alkoxy, nitro, or cyano groups.

The aromatic nucleus of the primary hydroperoxides of this invention need not be derived from benzene as in the case of benzyl hydroperoxide. Primary hydroperoxides containing aromatic nuclei such as those derived from naphthalene, anthracene, and phenanthrene may also be decomposed in accordance with this invention to produce formaldehyde and the corresponding phenolic compounds. These condensed ring systems may have one or more alkyl, nitro, chloro, alkoxy, or cyano groups attached to the ring as in the case of the primary benzyl hydroperoxides mentioned above. When two or more alkyl groups are present, they may be the same or different and are not restricted to lower alkyl members.

The primary hydroperoxides of this invention are not limited to monohydroperoxides but include polyhydroperoxides such as primary dihydroperoxides, primary trihydroperoxides, etc. The polyhydroperoxides of this invention are produced by the extended oxidation of aromatic compounds having more than one methyl group attached to the aromatic nucleus. Thus, when p-xylene is oxidized for an extended period of time there is produced p-xylylene dihydroperoxide, the hydroperoxy groups being attached to the primary carbon atoms. The extended oxidation of trimethylbenzene results in the formation of a primary trihydroperoxide. The polyhydroperoxides decompose in accordance with this invention to produce the corresponding hydroxy compounds. For instance, p-xylylene dihydroperoxide decomposes to produce hydroquinone and the trihydroperoxide of trimethylbenzene decomposes to trihydroxybenzene.

As exemplary of the primary hydroperoxides which may be decomposed in accordance with this invention, benzyl-, p-methylbenzyl-, ethylbenzyl-, diethylbenzyl-, p-isopropylbenzyl-, ethylpropylbenzyl-, methyl-propylbenzyl-, methyl-isopropylbenzyl-, dipropylbenzyl-, methyl-butylbenzyl-, methyl-isobutylbenzyl-, methyl-sec-butylbenzyl- and methyl-t-butylbenzyl hydroperoxides may be mentioned. Other species of primary hydroperoxides operable in this invention are p-xylylene-, methyl-p-xylylene- and ethyl-p-xylylene dihydroperoxides. Nitrobenzyl-, chlorobenzyl-, methoxybenzyl-, and cyanobenzyl hydroperoxides are examples of primary hydroperoxides operable in this invention which contain nonhydrocarbon substituents attached to the aromatic nucleus.

With regard to hydroperoxides derived from condensed ring systems which may be decomposed in accordance with this invention, there may be mentioned the primary hydroperoxides of methyl naphthalene, methyl anthracene, methyl phenanthrene, ring-substituted homologs of these compounds and also ring-substituted halogen, alkoxy, nitro, and cyano derivatives. Condensed ring systems having attached to the ring more than one hydroperoxymethyl group may also be decomposed in accordance with this invention. Thus, $\alpha,\beta$-dihydroperoxymethyl naphthalene can be decomposed to produce $\alpha,\beta$-dihydroxy naphthalene.

In carrying out the decomposition process of this invention, several different modifications of the hydroperoxides may be used. The hydroperoxide may be utilized, for example, either in the form of a pure hydroperoxide or in the form of a crude reaction mixture obtained by the oxidation. To obtain the hydroperoxide in concentrated form it is preferable to separate the hydroperoxides from the oxidate by countercurrent extraction with dilute alkali. However, fractional distillation at reduced pressures is also effective.

The hydroperoxides of this invention, therefore, may be decomposed when in the pure state and also when contained in mixtures with varying amounts of other organic materials. Any of the hydroperoxide materials may be dissolved in a suitable organic solvent which is inert to any of the reactants, products or reaction conditions involved in the process of this invention. The solvent should be nonreactive under the conditions of reaction to the hydroperoxide, the catalyst and any of the phenolic reaction products obtained by the decomposition. Exemplary of such solvents are the aliphatic, cycloaliphatic, and aromatic hydrocarbons, alcohols, ketones, ethers, esters, and liquid chlorinated hydrocarbons. Exemplary of these solvents are pentane, hexane, benzene, toluene, xylene, cumene, chloroform, carbon tetrachloride, ethanol, acetone, methyl acetate, diethyl ether, and the like. In addition, various acidic solvents such as glacial acetic acid which may exert some catalytic activity may be used. The concentration of the solvent and the hydroperoxide in the solution is limited only by the reactivity of the hydroperoxide during the decomposition, the effectiveness of the catalyst, and the temperature and pressure used.

The decomposition reaction also may be carried out in the vapor phase. The hydroperoxide may be vaporized and brought into intimate contact with the catalyst and the decomposition will readily occur. The vapor process is advantageous in that the phenolic compound produced can be vaporized immediately from the reaction zone.

The decomposition reaction of this invention may be carried out either under substantially anhydrous conditions, or in the presence of an aqueous phase. There may be used in the process any catalyst capable of decomposing the hydroperoxide to the corresponding phenol. Generally illustrative of such catalysts are those materials known as condensation catalysts, particularly the acidic condensation catalysts such as anhydrous ferric chloride, boron trifluoride, montmorillonite, kaolinite, vermiculite, silica gel, kaolin, fuller's earth, diatomaceous earth, halloysite, trichloroacetic acid, picric acid, dichloroacetic acid, chloroacetic acid; sulfonic acids such as benzenesulfonic acid, p-toluenesulfonic acid, and sulfonated phenol-formaldehyde and styrene-divinylbenzene polymers; cracking catalysts such as phosphoric acid-on-alumina; and various phosphorous compounds such as phosphorus trichloride, phosphorus pentachloride, and phosphorus oxychloride. Included within this class are various materials such as the silicates, silica gel, kieselguhr, hydrosilicates, and bauxite which are surface-active substances composed of basic compounds but which have sufficient acidic surface activity to render them operable in the process. Also included are the Friedel-Crafts catalysts such as aluminum chloride, ferric chloride, boron trifluoride, zinc chloride, stannic chloride, and magnesium chloride, all of which may be supported on a carrier, which itself may have catalytic activity; other supported catalysts such as phosphoric acid on fuller's earth or silica; inorganic acids, for example, nitric, hydrochloric, or sulfuric acid; and organic acids, for example, acetic acid, propionic acid, trinitroacetic acid, mononitroacetic acid, picric acid, benzenesulfonic acid, and p-toluenesulfonic acid. All these catalysts are illustrative of the class of catalysts known as acidic condensation catalysts.

The concentration of the catalyst based on the hydroperoxide will depend on the reactivity of the catalyst, the temperature of reaction, the desired reaction time and the mode of operation. In a batch decomposition process, the concentration generally may be from about 0.01% to about 200%. A preferable catalyst concentration on this basis is from about 1% to about 20%, and a particularly applicable amount in most instances is about 5%. In the case of those catalysts wherein it is possible to calculate their molar concentrations relative to the hydroperoxide, the range of catalyst concentration may be expressed as from about 0.01 mole per cent to about 200 mole per cent based on the hydroperoxide, a preferable range on this basis being from about 1% to about 10%. In a continuous operation the ratio of catalyst to hydroperoxide at any particular instant may be as high as 100 to 1, depending upon the design of the reactor, the size of the catalyst particles, and the rate of flow of the hydroperoxide over the catalyst bed.

The decomposition can also be carried out under conditions involving an aqueous phase in which case a water-soluble acid is preferably used. Both inorganic and organic water-soluble acids are operable. Exemplary of the inorganic acids are hydrochloric, sulfuric and phophoric acids. The organic acids may be exemplified by the organic sulfonic acids such as p-toluenesulfonic acid. It is desirable that the concentration of the acid in the aqueous phase be at least 20% by weight, a preferable range on this basis being from 20% to about 65%. Particularly applicable is a concentration range from 20% to about 50%. Concentrations of acid below 20% by weight produce lower yields and require appreciably longer reaction times.

The temperature may be varied, depending principally upon the activity of the catalyst. In general, the decomposition reaction may be effected over a temperature range of about $-80°$ C. to about 400° C. When using anhydrous conditions, a preferable range is about 0° C. to about 200° C. When using an aqueous phase, a preferable range is about 15° C. to about 100° C.

The examples have shown the decomposition reaction as being carried out at atmospheric pressure. The reaction, however, may be effected under reduced pressure and it is obvious that it also may be carried out under pressures greater than atmospheric. A broad range of pressure conditions is possible but from a practical standpoint the reaction preferably is carried out either at atmospheric or slightly less than atmospheric pressure.

The process of decomposing the products of this invention to phenols has many outstanding advantages over previous processes for the preparation of phenols. The reaction is adapted to the use of inexpensive, simple equipment and due to the fact that it is possible in the hydroperoxides of this invention to have the substituents in definite relationship to each other, it is possible through decomposition of the hydroperoxides to obtain phenols which also contain the phenolic and other substituents in definite relationship to each other. This is a definite advantage over prior processes in which a mixture of isomers always was obtained.

The decomposition of the hydroperoxides of this invention represents a more economical and efficient means for obtaining phenols. Due to the simple nature of the process, it will be found particularly applicable to small scale installations and will not require the vast outlay of capital and equipment required by previous processes.

What I claim and desire to protect by Letters Patent is:

1. The process of producing a phenolic compound which comprises contacting a primary hydroperoxide, containing an aromatic nucleus having attached to the ring thereof at least one hydroperoxymethyl group, with an acidic condensation catalyst.

2. The process of producing a phenolic compound which comprises contacting a primary hydroperoxide, containing an aromatic nucleus having attached to the ring thereof at least one hydroperoxymethyl group, with an acidic condensation catalyst and separating the phenol from the reaction mixture.

3. The process of producing phenol which comprises contacting benzyl hydroperoxide with an acidic condensation catalyst.

4. The process of producing p-cresol which comprises contacting p-methylbenzyl hydroperoxide with an acidic condensation catalyst.

5. The process of producing hydroquinone which comprises contacting p-xylylene dihydroperoxide with an acidic condensation catalyst.

6. The process of producing p-isopropylphenol which comprises contacting p-isopropylbenzyl hydroperoxide with an acidic condensation catalyst.

7. The process of producing β-naphthol which comprises contacting β-naphthylmethyl hydroperoxide with an acidic condensation catalyst.

8. The process of producing phenol which comprises contacting benzyl hydroperoxide with sulfuric acid.

9. The process of producing p-cresol which comprises contacting p-methylbenzyl hydroperoxide with sulfuric acid.

10. The process of producing p-isopropylphenol which comprises contacting p-isopropylbenzyl hydroperoxide with sulfuric acid.

11. The process of producing hydroquinone which comprises contacting p-xylylene dihydroperoxide with sulfuric acid.

12. The process of producing β-naphthol which comprises contacting β-naphthylmethyl hydroperoxide with sulfuric acid.

13. The process of producing a phenolic compound which comprises contacting a primary hydroperoxide, containing an aromatic nucleus having attached to the ring thereof at least one hydroperoxymethyl group, with an acidic surface active clay catalyst and separating the phenol from the reaction mixture.

14. The process of producing a phenolic compound which comprises contacting a primary hydroperoxide, containing an aromatic nucleus having attached to the ring thereof at least one hydroperoxymethyl group, with a Friedel-Crafts catalyst and separting the phenol from the reaction mixture.

15. The process of producing a phenolic compound which comprises contacting a primary hydroperoxide, containing an aromatic nucleus having attached to the ring thereof at least one hydroperoxymethyl group, with an inorganic acid catalyst and separating the phenol from the reaction mixture.

16. The process of producing a phenolic compound which comprises contacting a primary hydroperoxide, containing an aromatic nucleus having attached to the ring thereof at least one hydroperoxymethyl group, with an organic acid catalyst and separating the phenol from the reaction mixture.

17. The process of producing a phenolic compound which comprises contacting a primary hydroperoxide, containing an aromatic nucleus having attached to the ring thereof at least one hydroperoxymethyl group, dissolved in an inert organic solvent, with an acidic condensation catalyst and separating the phenol from the reaction mixture.

18. The process of claim 17 wherein the inert organic solvent is acetone.

References Cited in the file of this patent

UNITED STATES PATENTS

| Number | Name | Date |
|---|---|---|
| 2,626,281 | Joris | Jan. 20, 1953 |

FOREIGN PATENTS

| Number | Country | Date |
|---|---|---|
| 626,095 | Great Britain | July 8, 1949 |

OTHER REFERENCES

Hock et al.: Berichte, vol. 77B, pages 257, 264 (1944), 8 pages, Abstracted in Chem. Abs., vol. 39, column 3526, 7 (1945), 2 pages.

Kharasch et al.: Jour. Organic Chemistry, vol. 16, pages 150–160 (Jan. 1951) (11 pages).